Feb. 13, 1962    R. GUYER ET AL    3,020,809
APPARATUS FOR DIE CUTTING PAPERBOARD
Filed July 14, 1958    2 Sheets-Sheet 1

INVENTORS
REYNOLDS GUYER
NELS H. SANDBERG.
BY Robert M. Dunning
ATTORNEY

Feb. 13, 1962   R. GUYER ET AL   3,020,809
APPARATUS FOR DIE CUTTING PAPERBOARD
Filed July 14, 1958   2 Sheets-Sheet 2

INVENTORS
REYNOLDS GUYER
NELS H. SANDBERG.
BY Robert M. Dunning
ATTORNEY

United States Patent Office 3,020,809
Patented Feb. 13, 1962

3,020,809
APPARATUS FOR DIE CUTTING PAPERBOARD
Reynolds Guyer, White Bear Lake, and Nels H. Sandberg, St. Paul, Minn., assignors to Waldorf Paper Products Company, St. Paul, Minn., a corporation of Minnesota
Filed July 14, 1958, Ser. No. 748,533
9 Claims. (Cl. 93—58.3)

This invention relates to an improvement in method and apparatus for die cutting paperboard and deals particularly with a method and apparatus for simultaneously cut creasing opposite sides of the board. Tear strips have been produced in paperboard cartons and the like by die cutting the paperboard from opposite sides thereof to provide removable areas which are defined by relatively widely spaced cut creases extending into one surface of the board and more closely spaced cut creases extending in parallel side-by-side relation to the first creases and extending into the opposite side of the sheet. When the intermediate area is grasped, the paperboard splits from one cut crease to the other to permit removal of the defined area. Under normal circumstances this operation is done by first die cutting one side of the sheet and then die cutting the opposite side of the sheet in a separate operation. This method has been followed as cutting presses normally provided with a die which is engageable with one side only of the sheet.

Cutting presses are normally provided with a relatively fixed or stationary platen including a bolster plate and a die cutting plate having a flat surface overlying and secured to the bolster plate. The die itself is mounted upon a movable platen to move toward and away from the die cutting plate. The dies are usually made up through the use of cutting rule, creasing rule, and die cutting rule. One edge of this rule projects from a surface of the die and the other edge abuts against the surface of the platen. The cutting rule is of proper width to engage the surface of the die cutting plate during the cutting operation while the creasing rule and die cutting rule is of somewhat narrower width and the operating edge of this rule is in spaced relation to the die cutting plate in closed position or cutting position of the platens. The various rule is held in proper relation by wooden die blocks which are held in a suitable chase by the usual furniture. Makeready is usually applied to the surface of the die cutting plate on either side of the creasing rule so as to form a shallow channel into which the paperboard may be forced.

In usual practice, the cutting rule projects about 9/16 of an inch from the surface of the die block and small cork or rubber blocks are adhered to the surface of the die blocks on either side of the cutting rule so as to automatically strip the blank from the die as the platens move apart. The cutting press may be of any suitable style but in the particular arrangement described, the die forms a part of a continuous web printing and carton forming machine in which the web moves between the platens and is held stationary for just sufficient time for the die to engage the sheet while stationary. In usual practice, the carton blanks are not completely cut from the web so that the cartons remain in a continuous strip as they leave the cutting die.

In view of the fact that the distance between the exposed surface of the die blocks and the die cutting plate is considerably in excess of the thickness of the paperboard being cut, it has been impractical in a die of this type to die cut from both sides. In the first place the fixed platen of the press is not ordinarily designed to accommodate a die and it is normally necessary to have a die cutting plate against which the cutting rule may engage for the cutting operation and against which the sheet is pressed by the creasing rule and die cutting rule. It is an object of the present invention to reconstruct a press of this type to produce an apparatus capable of die cutting the sheet from both sides.

A feature of the present invention resides in the provision of metal inserts into the die supported upon the movable platen against which die cutting edges projecting through the die cutting plate may operate. These inserts are so arranged that the exposed surface of the inserts are spaced from the surface of the die cutting plate a distance substantially equal to the thickness of the paperboard being cut. As a result, over the specific areas of the die in opposed relation to the die cutting edges on the fixed platen, an extremely accurate control of the depth of cut may be obtained.

A feature of the present invention resides in the revising of the die cutting section of a carton forming machine by providing a spacer between the bolster plate and the die cutting plate and lowering the bolster plate sufficiently to compensate for this thickness. The spacer and the die cutting plate are of a combined thickness which is slightly less than the width of the die cutting rule. By providing one or more apertures in the die cutting plate and the spacer, die cutting rule may be inserted in the aperture with the cutting edge of the rule projecting slightly above the level of the die cutting plate and the opposite edge bearing against the platen or bolster plate. By forming the aperture in the die cutting plate and spacing plate similar to the area of the paperboard to be removed from the carton panel or panels, the die cutting rule may be mounted to extend along the wall of the aperture and may be held in place by a similarly shaped die block or die blocks. By following this method, conventional die cutting rule may be employed and the finished die may be constructed much in the manner of a normal die except for the step of milling out the aperture in the die cutting plate. The spacer may be formed of wood such as may be used for the regular die and thus the aperture in the spacer may be formed by jigsawing the wood to the proper design in the usual manner.

In the formation of tear strips of the type employing a peripheral pair of die cut grooves in opposite sides of the paperboard, it is usual practice to have the die cuts or grooves extend approximately one-half the thickness of the paperboard from either side thereof although the exact depth of these grooves is found not to be extremely critical. By following the method described, the inner of the two die cut lines is normally formed by a die positioned in an aperture in the die cutting plate and the outer of the two side-by-side lines is formed by cutting out a similar somewhat larger area in the upper die. This is done so that the areas of the die cutting plate against which the die cutting knives in the upper die force the sheet will not be affected. A metal insert provided in the upper die within the area defined by the tear strip and this metal insert provides a solid surface against which the die cutting knives in the lower die may operate.

These and other objects and novel features of the present invention will be more clearly and full set forth in the following specification and claims.

In the drawings forming a part of the specification, FIGURE 1 is a perspective view of a carton showing a removeable tear strip area in a panel thereof.

Figure 6:
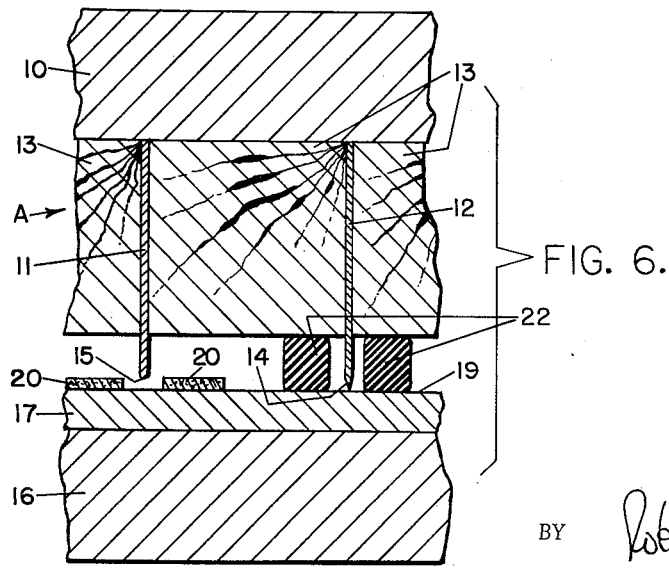
FIGURE 6 is a cross-sectional view through a conventional die and press portion, showing the normal arrangement of parts therein.

FIGURE 6 of the drawings has been inserted to indicate the usual arrangement of a die in a press of the type in question. The numeral 10 indicates diagrammatically the upper or moveable platen and the die is indicated in general by the letter A. As is well known in the art, the die A of the type used in many presses includes creasing rule such as 11 and cutting rule such as 12 which are held in properly spaced relation by wooden die blocks 13. The die blocks 13 are usually cut from hard plywood which is most commonly ¾ of an inch in thickness. The cutting rule 12 is provided with a sharpened cutting edge 14 and this rule is usually slightly less than 1 inch in width. The creasing rule 11 is usually provided with a rounded edge 15 and is a small fraction of an inch narrower than the cutting rule 12.

The lower fixed platen or bolster plate 16 serves as a support for a metal die cutting plate 17 which is secured to the bolster plate in any suitable manner and which has a flat upper surface 19 against which the paperboard sheets are forced by the die. Makeready 20 usually in the form of paperboard strips is adhered to the upper surface 19 of the die cutting plate 17 along opposite sides of each piece of creasing rule 11. These strips 20 of makeready form a shallow channel into which a portion of the paperboard sheet may be forced by the creasing rule 11. The movement of the upper platen 10 is such that the cutting edge 14 of the cutting rule 12 just contacts the surface 19 of the die cutting plate when the platens are in closed or cutting position.

As is indicated in FIGURE 6 of the drawings, small blocks of sponge rubber, cork or other compressible material are shown at 22 on opposite sides of the cutting rule 12. As the press closes, these resilient blocks engage against the sheet and are compressed during the cutting operation. As the die A moves away from the die cutting plate 17, these blocks 22 act to strip the sheet from the cutting knives so that these sheets will not remain wedged in place upon the die A.

Figure 1:
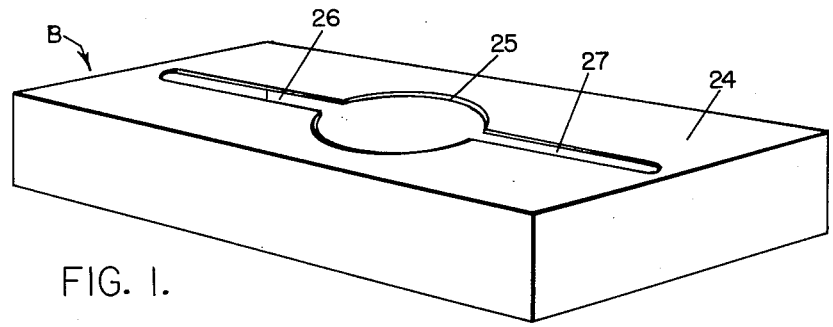
Figures 2, 3:
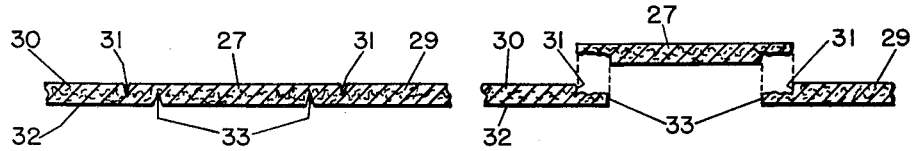
FIGURE 2 is a sectional view through a portion of the paperboard containing the tear strip, showing the arrangement of die cut lines therein.
FIGURE 3 is a view similar to FIGURE 2 after the removeable area has been partially removed.

In preparing the press for die cutting on opposite sides of the sheet, the die cutting plate 17 was removed from the bolster plate or lower platen 16 and a spacer 23 was interposed between the bolster plate 16 and the die cutting plate 17. The spacer 23 may be a thick metal plate or may comprise a hard wood panel which appears to have had sufficient compressive strength. In the spacer 23 and in the die cutting plate 17 are cut registering apertures defining the shape of an area to be removed in the completed carton. For example, the carton B illustrated in FIGURE 1 of the drawings is a carton of the type used in dispensing facial tissues and the like. The top panel 24 of the carton B is shown as including a removable area including a central rounded enlarged portion 25 and oppositely directed narrower portions 26 and 27. The combined area 25, 26, and 27 is defined by cut score lines which extend into the sheet from opposite directions. For example in FIGURE 2 the sheet 29 is shown as having an area in the outer surface 30 thereof defined by cut score lines 31 which extend perhaps half way through the sheet 29 and the under surface 32 of the sheet 29 has a similar but slightly smaller area defined by the cut score lines 33. The cut score lines 31 and 32 are in spaced side by side relation throughout at least the major portion of the removeable area so that when an end of the area is grasped and pulled upwardly, the paperboard will split between the cut score line in the manner graphically illustrated in FIGURE 3 of the drawings.

When the aperture has been formed in the die cutting plate 17 and spacing plate 23, die cutting knives 34 are cut and bent to fit about the portion of the periphery of the part to be removed which is to be die cut. The die cutting knives or rule 34 is of approximately the same length as the creasing rule 11 and is somewhat narrower than the cutting rule 12. As a result, when the die is closed, the cutting rule 34 will not extend entirely through the paperboard. The cutting rule 34 is held in proper position by a die block or die blocks 35 which hold the knives against the wall of the apertures 36 and 37 in the die cutting plate 17 and spacer 23 respectively. Obviously, the die cutting plate 17 and spacer 23 may comprise an integral plate if it is preferred.

When assembled in the manner described, the cutting edges 39 of the die cutting rule 34 project above the upper surface 19 of the die cutting plate a distance substantially equal to one-half the thickness of the paperboard to be cut. For example, if the sheet C to be cut is of a thickness of 24 points or 24/1000 of an inch, the knife edges 39 may project from the surface 19 a distance of perhaps 12/1000 of an inch. In actual practice, however, this distance may vary to some extent and the cutting edge 39 may extend slightly less than one-half of the thickness of the board to almost the entire thickness of he board and still produce proper results. If the spacer 23 is formed of hard plywood, the aperture 37 may be cut into the wood with a jig saw in the usual manner using a blade of equal thickness to that of the die cutting rule 37 so that the block 35 may be reinserted after the rule has been bent and inserted into the aperture.

The die A which is made is, for the most part, of conventional form. The cutting rule 12 and creasing rule 11 is arranged in the desired pattern to form the blank of the carton B. In the portion of the die designed to form the panel 24, an aperture 40 is formed which is of the same shape as the apertures 36 and 37, but of slightly larger dimensions. Die cutting rule 41 similar to the die cutting rule 34 is cut and bent to the shape of the aperture 40 and is inserted therein in the usual manner. However, within the area defined by the inner edges of the cutting rule knives 41, a metal insert 42 is provided and the arrangement is such that the under-surface 43 of the insert 42 is spaced from the upper surface 19 of the die cutting plate 17 a distance substantially equal to the thickness of the paperboard sheet C. The cutting edges 44 of the die cutting rule 41 project from the undersurface 43 of the insert 42 a distance of perhaps the thickness of the paperboard sheet C. While this distance may vary to some extent as has been explained, an attempt is made to have the cutting edges 44 of the die cutting rule 41 and the cutting edge 39 of the die cutting rule 34 on approximately the same plane when the press is closed. If the die is made in the usual manner, forming the aperture 40 by jigsawing the periphery of the aperture, the insert 42 may be a metal plate of the same shape as the block removed which may underlie the block and be secured thereto. Obviously, however, the block 45 may be eliminated and the insert 42 may extend the full depth of the combined block 45 and insert 42 if it is desired.

Figure 5:
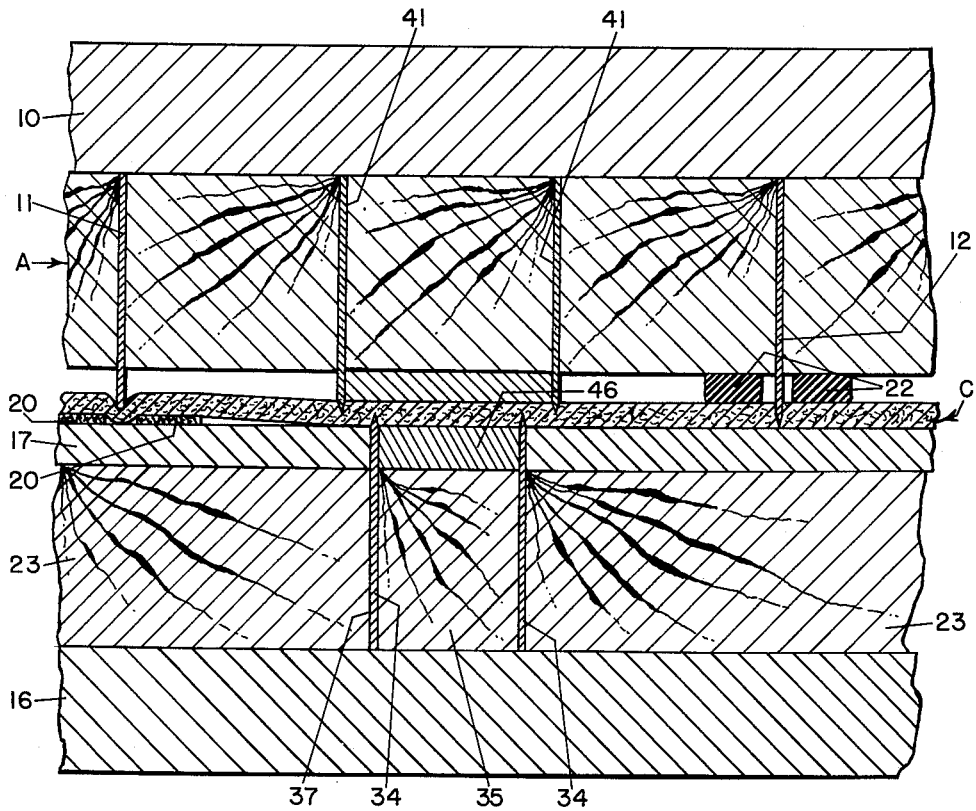
FIGURE 5 is a view similar to FIGURE 4 but showing the die in closed position.

FIGURE 5 of the drawings shows in magnified form the manner in which the sheet C is acted upon when the press is closed. It will be noted that the cutting rule 12 extends entirely through the sheet to cut the marginal shape of the blank. The creasing rule 11 forces a portion of the sheet C between the strips of makeready 20 to form a channel on one side of the sheet and the rib or bead on the opposite side thereof as is usual practice in creasing paperboard. The die cutting rule 41 urges a portion of the sheet toward the die cutting plate 17 and penetrates the sheet to perhaps half its thickness. Simultaneously, the die cutting knives 34 urge a portion of the sheet against the insert 42 and penetrate the opposite side of the sheet to perhaps half the thickness of the paperboard.

It is recognized that variations in the caliper of the board being used are likely to occur and as a result the resultant product is not entirely uniform. However, if the thickness of the sheet is excessive, the portion of the sheet between the upper and lower die cutting knives may be compressed slightly. The caliper of the board under normal circumstances will not vary more than $1/1000$ or $2/1000$ of an inch which may be readily compensated for in the die cutting operation as the die cut lines do not have to extend to the exact center of the sheet to make the structure operable so that if the board is thinner than usual, no harmful results will be obtained. If desired, the die cutting knives 34 and 41 may extend slightly more than one-half the thickness through a sheet of maximum caliper so that knives may penetrate to the center of a thinner sheet.

Figure 4:
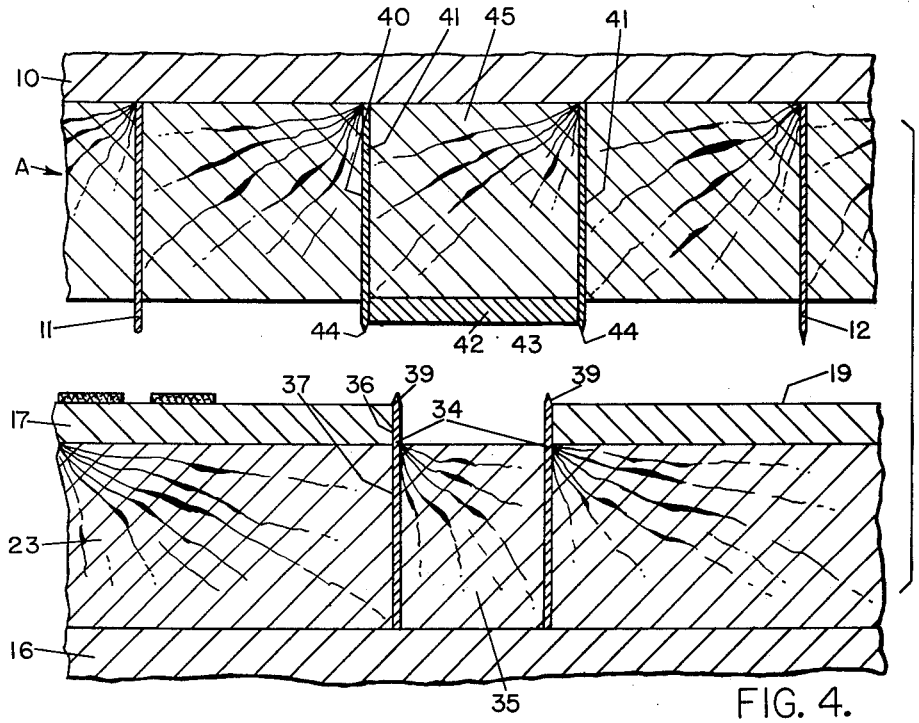
FIGURE 4 is an enlarged cross-sectional view of a cutting die in partially open position showing the general arrangement thereof.

FIGURE 5 of the drawings shows a portion of the die cutting plate 17 indicated at 46 lying inwardly of the die cutting knives 34 to complete this surface. It is possible to omit this portion 46 of the plate as indicated in FIGURE 4 of the drawings without harmful results.

In accordance with the patent statutes, we have described the principles of construction and operation of our method and apparatus for die cutting paperboard, and while we have endeavored to set forth the best embodiment thereof, we desire to have it understood that obvious changes may be made within the scope of the following claims without departing from the spirit of our invention.

We claim:

1. An apparatus for die cutting both sides of paperboard sheets and the like including a fixed platen having a metal die cutting plate thereon, said plate having a flat outer surface, a lower die including die cutting edges projecting from said cutting plate, a movable platen cooperable with said fixed platen, a wooden die supported by said movable platen and including die cutting rule projecting therefrom, and inserts having flat outer surfaces in said wooden die opposite said die cutting edges projecting from said die cutting plate, said surfaces of said inserts being spaced from said outer surface of die cutting plate a distance substantially equal to the thickness of the sheets being die cut in cutting position of said platens, said die cutting edges of said die cutting plate being spaced substantially from said die cutting rule of said wooden die when said dies are in cutting position.

2. The structure of claim 1 and in which said inserts are metal.

3. The structure of claim 1 and in which said cutting edges comprise the edges of cutting rule.

4. An apparatus for die cutting paperboard sheets and the like from opposite directions, the apparatus comprising a fixed platen, a die cutting plate mounted on said platen and having an aperture therethrough, die cutting rule supported in said aperture with one edge abutting said platen and the cutting edge thereof projecting from said die cutting plate, a movable platen cooperable with said fixed platen to die cut sheets therebetween, a die mounted on said movable platen, said die having die cutting rule supported in predetermined relation by die blocks, the surfaces of said die blocks being spaced from the die cutting plate a distance substantially greater than the thickness of the sheets in die cutting position of said platens, and inserts in said die in opposed relation to the cutting edges of the cutting rule in said aperture, said inserts having their exposed surface spaced from said die cutting plate a distance substantially equal to the thickness of said sheets in die cutting position of said platens.

5. The structure of claim 4 and in which said inserts are composed of metal.

6. An apparatus for die cutting a tear strip in sheets of paperboard and the like, the tear strip including an area bounded at least through most of its periphery by cut score lines extending partially through the sheets from opposite sides thereof, the cut score lines extending into one side of the sheet being spaced inwardly of the cut score lines extending into the other side of the sheet and being in closely spaced side by side relation thereto, the apparatus including a fixed platen having a metal die cutting plate mounted thereon, said plate having an aperture therethrough, die cutting rule in said aperture having a flat surface and having its cutting edge projecting from said surface of said plate, and having its opposite edge bearing against said platen, means holding said cutting rule in position in said aperture, a movable platen cooperable with said fixed platen to cut a sheet therebetween, a die on said movable platen, die cutting rule supported in said die and projecting therefrom, die blocks supporting said last named die cutting rule in a predetermined position, the surface of said die blocks being spaced from said die cutting plate a distance substantially greater than the thickness of said sheets in die cutting position of said platens, and an insert in said die in opposed relation to said cutting edge of said die cutting rule in said aperture and having a flat surface spaced from said surface of said die cutting plate a distance substantially equal to the sheet thickness in die cutting position of said platens, the die cutting rule in said aperture being of substantially the same configuration as the cutting rule in said die and spaced therefrom to define said tear strip.

7. The structure of claim 6 and in which the aperture is of substantially the size and shape of the inner cut score lines of said tear strip and the cutting rule therein is supported against the wall of said aperture.

8. The structure of claim 7 and in which the die cutting rule in said die is in opposed relation to said die cutting plate outwardly of said aperture.

9. An apparatus for cutting and scoring carton blanks, and simultaneously die cutting opposite sides of paperboard sheets, including a fixed platen and a cooperable movable platen movable toward and away from said fixed platen, a die cutting plate on one of said platens having a flat surface and having an aperture therethrough, die cutting rule supported in said aperture with a cutting edge projecting from the surface of said plate, a die supported by the other of said platens, said die including cutting rule supported by die blocks and projecting therefrom a distance sufficient to contact said die cutting plate in cutting position of said platens, the distance between said die blocks and said die cutting plate being substantially greater than the thickness of said carton blanks in cutting position of said platens, die cutting rule and creasing rule supported in said die by said die blocks, said last mentioned die cutting rule and creasing rule having an edge projecting from said die blocks and terminating in spaced relation to said die cutting plate, and a metal insert having a flat exposed surface portion in said die in opposed relation to said die cutting rule in said aperture, the surface of said inserts being spaced from said surfaces of said die cutting plate a distance substantially equal to the thickness of said carton blanks, said die cutting rule in said aperture having its cutting edge spaced from the surface of said insert.

References Cited in the file of this patent

UNITED STATES PATENTS

| | | |
|---|---|---|
| 613,236 | Bradley | Nov. 1, 1898 |
| 673,822 | Sagendorph | May 7, 1901 |
| 2,195,819 | Kurtzeborn | Apr. 2, 1940 |
| 2,313,801 | Carll | Mar. 16, 1943 |
| 2,821,871 | Sarno | Feb. 4, 1958 |

FOREIGN PATENTS

| | | |
|---|---|---|
| 165,649 | Australia | Nov. 19, 1953 |